(12) United States Patent
Ishii et al.

(10) Patent No.: US 6,726,995 B2
(45) Date of Patent: *Apr. 27, 2004

(54) POLARIZING PLATE

(75) Inventors: Yoshinori Ishii, Moriyama (JP); Takeshi Yamamoto, Moriyama (JP); Takao Uesugi, Niigata (JP); Koichi Watanabe, Joetsu (JP)

(73) Assignees: Gunze Co., LTD, Ayabe (JP); Poratechno Co., Ltd., Niigata (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/149,447
(22) PCT Filed: Dec. 28, 2000
(86) PCT No.: PCT/JP00/09422
§ 371 (c)(1), (2), (4) Date: Oct. 23, 2002
(87) PCT Pub. No.: WO01/48519
PCT Pub. Date: Jul. 5, 2001

(65) Prior Publication Data
US 2003/0091792 A1 May 15, 2003

(30) Foreign Application Priority Data
Dec. 28, 1999 (JP) ............................................. 11-373831

(51) Int. Cl.[7] ................................................. G02B 5/30
(52) U.S. Cl. ................. 428/424.4; 359/483; 428/424.2; 428/424.8; 428/520; 428/521
(58) Field of Search .......................... 428/424.2, 424.4, 428/424.8, 520, 521; 359/483

(56) References Cited
FOREIGN PATENT DOCUMENTS

| JP | 03-130702 | 6/1991 |
|----|-----------|--------|
| JP | 05-212828 | 8/1993 |
| JP | 06-088908 | 3/1994 |
| JP | 06-118232 | 4/1994 |
| JP | 07-077608 | 3/1995 |
| JP | 07-294732 | 11/1995 |
| JP | 07-306315 | 11/1995 |
| JP | 08-271733 | 10/1996 |
| JP | 09-127332 | 5/1997 |
| JP | 11-142645 | 5/1999 |
| JP | 2000-266935 | 9/2000 |
| JP | 2000-321430 | 11/2000 |
| JP | 2000-321432 | 11/2000 |
| JP | 2001-108826 | 4/2001 |

*Primary Examiner*—D. S. Nakarani
(74) *Attorney, Agent, or Firm*—Westerman, Hattori, Daniels & Adrian, LLP

(57) ABSTRACT

A polarizing plate with which a drop in polarization efficiency, hue shift, and light leakage do not substantially arise, under a high humidity/high temperature environment is provided. The polarizing plate of the present invention comprises a polyvinyl-alcohol-based polarizing film, a protective film having thereon two anchor coat agent layers, mainly composed of a cyclic-olefin-based resin, laminated on at least one side of the polarizing film, with an adhesive. The amount of change in optical in-plane retardation of the protective film is 5 nm or less after 24 hours in an atmosphere of 80° C., and the wetting tension of the anchor coated surface of the protective film is 500 μN/cm (23° C.) or more. The anchor coat agent layers include a first layer made of polyisocyanate and polyester polyol and/or polyether polyol, and a second layer made of polyvinyl alcohol. The adhesive is made of polyvinyl alcohol.

3 Claims, 2 Drawing Sheets

1 Glass Substrate
2 Binder
4 Polarizer (a)

1 Glass Substrate
2 Binder
4 Polarizer (b)

POLARIZING PLATE

TECHNICAL FIELD

The present invention relates to a polarizing plate, particularly to having high durability and high polarization efficiency that is useful for liquid crystal displays (LCDs) and more specifically, to an improvement in a polarizing plate for substantially preventing mainly drop in polarization efficiency, hue shift, and light leakage even under a high humidity/high temperature environment.

BACKGROUND ART

A conventional polarizing plate with high polarization efficiency is generally such that a cellulose-triacetate-based (hereinafter, referred to as TAC) film, which serves as a protective film, is laminated on a polarizing film in which iodine or a dichroic dye is adsorbed and oriented in a polyvinyl-alcohol-based (hereinafter, referred to as PVA) film with an aqueous solution of PVA resin, which serves as an adhesive, in a state of wet or semidry flowability.

However, since the water absorption and water vapor permeability of TAC is high in a polarizing plate using TAC for the protective film, deterioration in polarization performance under a high humidity/high temperature environment, specifically, drop in polarization efficiency, hue shift, and light leakage under crossed nicols, has been significant.

In order to overcome these problems, polarizing plates that use a film made of a resin with low water absorption and low water vapor permeability for the protective film have been proposed.

For example, Japanese Unexamined Patent Publication No. 7-77608 discloses a polarizing plate such that a film serving as a protective film and made of a thermoplastic saturated norbornene-based resin is adhered to a PVA-based polarizing film using an acrylic-based adhesive or a polyester-isocyanate-based adhesive. After such a polarizing plate is subjected to an environment of 80° C. and 90%RH for 500 hours, the polarization efficiency is 95% or higher and the single transmissivity is 38% or higher.

In addition, Japanese Unexamined Patent Publication 7-294732 discloses a polarizing plate such that a film having a photoelastic coefficient of $25.0 \times 10^{-13}$ cm$^2$/dyne or less, for example, a film made of an amorphous polyolefin as Zeonex, or polymethyl methacrylate such, serves as a support for a polarizing element film, and the support is adhered to the polarizing element film using an acrylic-based adhesive. After such a polarizing plate is subjected to an environment of 60° C. and 90%RH for 100 hours, the pyschometric lightness is small.

However, although these polarizing plates are able to suppress a drop in polarization efficiency under a wet heat environment, it cannot be said that suppression of hue shift and light leakage is sufficiently realized.

DISCLOSURE OF THE INVENTION

In the view of the foregoing and other problems, it is an object of the present invention to provide a polarizing plate with which, not only suppression of a drop in polarization efficiency is achieved, but also with which hue shift and light leakage do not substantially arise, under a high temperature/high humidity environment.

A polarizing plate of the present invention comprises a polyvinyl-alcohol-based polarizing film, a protective film, mainly composed of a cyclic-olefin-based resin having thereon two anchor coat agent layers, laminated on at least one side of the polarizing film with an adhesive.

The amount of change in optical in-plane retardation of the protective film is 5 nm or less after 24 hours in an atmosphere of 80° C., and the wetting tension of the laminated surface of the protective film is 500 µN/cm (23° C.) or more.

A first anchor coat agent layer is made of polyisocyanate and polyester polyol and/or polyether polyol. A second anchor coat agent layer is made of polyvinyl alcohol.

The adhesive is made of polyvinyl alcohol.

The polarizing film of the present invention is produced by uniaxially stretching and orienting a film made of PVA or a derivative thereof, and subsequently, adsorbing iodine, carrying out a boric acid solution treatment, and drying the film while under tension. Such a film also may be produced by immersing a film made of PVA or a derivative thereof in an aqueous solution of iodine such that the iodine is adsorbed, and subsequently, uniaxially stretching and orienting the film in a boric acid solution and drying the film while under tension. Polarizing films that utilize dichroic dyes, such as those that are azo-based, anthraquinone-based, and tetrazine-based, instead of iodine are fabricated in the same manner as well.

The polarization efficiency of a polarizing film obtained in such a manner is preferably, 95.0% or higher, more preferably, 99.0% or higher, and even more preferably, 99.7% or higher.

Hue shift as referred to in the present invention denotes a phenomenon such that when a single polarizing plate or crossed nicols is placed in a wet heat atmosphere, hue shift occurs with the single polarizing plate or the crossed nicols.

When a liquid crystal display employing polarizing plates with which hue shift arises is used for a long period, the hue of the display changes and contrast deteriorates, becoming one cause of deterioration in the performance of the liquid crystal display.

Light leakage as referred to in the present invention denotes a phenomenon such that in-plane luminance changes when two polarizing plates arranged to have a crossed nicols relation are placed in a wet heat environment.

When a liquid crystal display that employs polarizing plates that generate light leakage is used for a long period, light leaks at the edges of the display when black is displayed, and thereby display contrast deteriorates, becoming one cause of deterioration in the performance of a liquid crystal display.

Having fully considered how to provide a polarizing plate with which, not only suppression of a drop in polarization efficiency is achieved, but also with which hue shift and light leakage do not substantially arise, under a high temperature/high humidity environment, the present inventors came to the following conclusion, by which the present invention was achieved.

First, suppression of a drop in polarization efficiency under a high temperature/high humidity environment can be achieved by using a film with low water absorption and low water vapor permeability for the protective film of a polarizing plate. Suppression of hue shift under a high temperature/high humidity environment can be realized by sufficiently adhering a polarizing film and a protective film and by suppressing reversion in the alignment of the polarizing film. Suppression of light leakage under a high temperature/high humidity environment can be realized by using a film having a small amount of change in optical in-plane retardation for the protective film of a polarizing plate.

The present inventors then fully considered how to substantiate these inferences.

For the present invention, a film mainly composed of cyclic-olefin-based resin was employed for the protective film of the polarizing plate, because such a film has low water absorption and low water vapor permeability, and various physical properties required of a protective film for a polarizing plate, such as light transmissivity. (In addition, because cyclic-olefin-based resin has a small photoelastic coefficient, it was conjectured to be useful in preventing light leakage.)

In the present invention, cyclic-olefin-based resin is used as a general term, specific examples (a) to (d) being shown below.

(a) polymers that are ring-opening (co-)polymers of cyclic olefin with hydrogen added as needed (b) (co-)polymers with cyclic olefin attached (c) random copolymers of cyclic olefin and an α-olefin such as ethylene or propylene (d) graft modified substances that result when the above (a) to (c) are modified with unsaturated carboxylic acid or derivatives thereof.

The cyclic olefin is not particularly limited, examples including norbornene, tetracyclododecene, and derivatives thereof (for example, substances containing a carboxyl group or an ester group).

Known additives such as ultraviolet absorbers, organic or inorganic antiblocking agents, slip additives, antistatic agents, and stabilizers may be added appropriately to the cyclic-olefin-based resin.

The method of forming a protective film from cyclic-olefin-based resin is not particularly limited, it being possible to employ methods such as solution casting, extrusion, and calendering.

Examples for a solvent used in solution casting include alicyclic hydrocarbons such as cyclohexane and cyclohexene and derivatives thereof, as well as aromatic hydrocarbons such as toluene, xylene, and ethyl benzene and derivatives thereof.

The thickness of the protective film is commonly 5–150 $\mu$m, preferably 10–100 $\mu$m, and more preferably 20–60 $\mu$m. When thickness is too thin, a film tends to be difficult to handle and when thickness is too thick, the amount of change in optical in-plane retardation tends to be large.

In order to determine the relationship between hue shift and the adhesive strength of a protective film/polarizing film under a high temperature/high humidity environment, tests were carried out using various adhesives with varying adhesive strength, and as was initially predicted, it was determined that there is a correlation between hue shift and the adhesive strength of a protective film/polarizing film. However, there was no adhesive with which hue shift substantially did not occur. In consideration of this, the present inventors considered various ways of increasing the adhesive strength and suppressing hue shift to the greatest possible degree and eventually, discovered two ways of overcoming the problems of adhesive strength and hue shift.

Specifically, first, the wetting tension of the surface of the protective film to be anchor coated is made to be 500 $\mu$N/cm (23° C.) or higher and preferably 550 $\mu$N/cm (23° C.). In order to achieve this value, it is not necessary to employ a particular technique, it being possible to use a technique known in the art. Examples for a surface treatment include a corona discharge treatment, an ultraviolet irradiation treatment, and a chemical treatment. The corona discharge treatment or ultraviolet irradiation treatment may be carried out in air or in an atmosphere of nitrogen or a rare gas.

When the wetting tension is lower than 500 $\mu$N/cm (23° C.), sufficient adhesive strength cannot be obtained.

Secondly, an anchor coat agent made of polyisocyanate and polyester polyol and/or polyether polyol is coated, as a first layer, on the protective film surface and dried, then on the resulting film, an anchor coat agent made of polyvinyl alcohol is coated, as a second layer and dried, and subsequently, an adhesive solution of polyvinyl alcohol is adhered to the polarizing film in a wet or semidry state.

The coating and drying of the anchor coat agents for two layers may be carried out directly before adhering the protective film and the polarizing film with an adhesive solution, or the film may be wound temporarily after coating the protective film surface with the anchor coat agents for two layers and drying, and adhering of protective film and polarizing film with an adhesive solution carried out at a later time.

The polyisocyanate of the anchor coat agent for the first anchor coat agent layer has two or more isocyanate groups in each molecule, the polyester polyol of the anchor coat agent for the first layer has ester bonds in its molecules and two or more hydroxyl groups in each molecule, and the polyether polyol of the anchor coat agent for the first layer has ether bonds in its molecules and two or more hydroxyl groups in each molecule.

The skelton structure of the polyisocyanate may be an aromatic ring or another structure, a long chain alkylene group being preferable from the perspective of adhesive strength. This is thought to be because long-chain alkylene has a degree of flexibility and thus good adhesion with the protective film surface is expected.

The mixing ratio of polyisocyanate and polyester polyol and/or polyether polyol is preferably, 20:1–1:20 and more preferably, 5:1–1:5, in consideration of the equivalence weight ratio of the hydroxyl groups and the isocyanate groups.

It is preferable that the amount of anchor coat agent be such that a thickness after drying of 0.001–5 $\mu$m results and more preferable that a thickness of 0.01–2 $\mu$m results. When too little anchor coat agent is used, adhesive strength often cannot be realized to the degree desired, and when too much is used, coating nonuniformities easily arise, which is often undesirable in terms of hue shift and light leakage.

Note that it cannot be said that substances that react with polyisocyanate other than polyester polyol and/or polyether polyol mentioned above, for example, acrylic-based substances, sufficiently demonstrate advantageous effects in terms of suppressing hue shift due to there weak adhesive strength to the protective film.

The polyvinyl alcohol of the anchor coat agent for the second layer is mainly composed of a resin that is obtained by carrying out a saponification treatment on vinyl acetate resin. It is preferable that the degree of polymerization be 1000–3000 and that the degree of saponification be 85% or higher and more preferable that the degree of polymerization be 1500–3000 and the degree of saponification be 98% or higher. Other monomers such as monomers copolymerized appropriately with a small amount of acrylic acid, crutonic acid, itaconic acid, and the like or monomers modified by alkyl groups, epoxy groups, or the like may be used.

A substance that reacts with polyvinyl alcohol, such as polyisocyanate, boric acid, alkylene diamine, and epoxy resin, may be added to the polyvinyl alcohol. Advantageous effects are obtained particularly with polyisocyanate in terms of improving in water resistance and easy handling.

The advantageous effects of the second anchor coat layer are as follows. First, the adhesive strength does not deteriorate for an extended period of time. When there is only the first anchor coat agent layer present, because the layer contains isocyanates, the layer easily deteriorates, and thus when only the first anchor coat is provided on the protective film, and stored for an extended period of time and then adhered to the polarizing plate, the adhesive strength is significantly reduced. However, when the second anchor coat layer is provided, an advantageous effect that the adhesive strength is not reduced for an extended period of time is obtained. Accordingly, a protective film having thereon the first anchor coat layer and the second anchor coat layer can be stored for an extended period of time, allowing the production and storing of the protective films in advance. Secondly, the second anchor coat layer has a degree of water absorbing property, and therefore an advantageous effect is obtained that the layer speedily absorbs moisture in an adhesive solution when adhered to the polarizing plate to complete adhesion in a short time.

It is preferable that the amount of anchor coat agent be such that a thickness after drying of 0.01–30 μm results, more preferable that a thickness of 0.1–15 μm results, and even more preferable that a thickness of 0.5–5 μm results. When too little anchor coat agent is used, adhesive strength to the first anchor coat layer often cannot be realized to the degree desired, and when too much is used, the cost effectiveness decreases.

The polyvinyl alcohol of the adhesive is mainly composed of a resin that is obtained by carrying out a saponification treatment on vinyl acetate resin. It is preferable that the degree of polymerization be 1000–3000 and that the degree of saponification be 94% or higher, and more preferable that the degree of polymerization be 1500–3000 and the degree of saponification be 98% or higher. Other monomers such as monomers copolymerized appropriately with a small amount of acrylic acid, crutonic acid, itaconic acid, and the like or monomers modified by alkyl groups, epoxy groups, or the like may be used.

It is preferable that the amount of adhesive solution be such that a thickness after drying of 0.01–10 μm results, more preferable that a thickness of 0.02–5 μm results, and even more preferable that a thickness of 0.05–3 μm results. When too little adhesive is used, adhesive strength often cannot be realized to the degree desired, and when too much is used, the cost effectiveness decreases.

A substance that induces reactive curing with polyvinyl alcohol, such as polyisocyanate, boric acid, alkylene diamine, and epoxy resin, may be added.

In order to determine the relationship between light leakage and the amount of change in optical in-plane retardation under a high temperature/high humidity environment, 50 μm thick protective films having varying amounts of change in optical in-plane retardation and mainly composed of various cyclic-olefin-based resins, and polarizing plates were fabricated using these protective films. Investigation into the amount of light leakage using a method described later revealed that there is a correlation between light leakage and the amount of change in optical in-plane retardation, as was initially predicted, and it was discovered that light leakage substantially does not occur when the amount of change in optical in-plane retardation is 5 nm or less.

In the tests, substances described previously were used for the laminated surface of protective film, the anchor coat agents, and the adhesive.

The amount of change in optical in-plane retardation was obtained as follows. As shown in FIG. 2(a), a protective film 3 cut to a size length×width=100 mm×100 mm was attached to a glass substrate 1 with a binder 2 made of acrylester-based base resin and an isocyanate-based curing agent interposed. The optical in-plane retardation was measured in each of nine sections divided as shown in FIG. 2(b), and the average value $R_0$ was obtained. After then subjecting this to an 80° C. atmosphere for 24 hours, the optical in-plane retardation was measured in the same nine sections, and the average value R was obtained. The difference between R and $R_0$ ($R-R_0$) was taken to be the amount of change in optical in-plane retardation. Note that an arrow shown in FIG. 2(b) indicates the length of the protective film 3.

For the most part, the amount of change in optical in-plane retardation is dependent on distortion of molecular chains in the protective film and on residual shrinkage percentage.

When a protective film is fabricated by solution casting, distortions in the molecular chains arise in the drying step. In addition, residual shrinkage percentage is affected by the orientation of the cyclic-olefin-based resin when the solution is stretched on a metal drum or an endless belt, by the orientation of cyclic-olefin-based resin caused by pulling tension in the drying step, and by the residual solvent.

When a protective film is fabricated by extrusion, distortions in the molecular chains arise during cooling and hardening with a chill roll after extrusion from an extruder. In addition, residual shrinkage percentage is affected by the draw during extrusion from the extruder and by the orientation of the cyclic-olefin-based resin caused by pulling tension from the point of cooling and hardening to the point of winding.

In order to make the amount of change in optical in-plane retardation of the protective film 5 nm or less, it is necessary to employ suitable methods such as correcting distortions in molecular chains in the protective film and reducing the residual shrinkage percentage.

For example, methods of correcting distortions of molecular chains and of reducing the residual shrinkage percentage include heating the film under a minus draw before winding the film and leaving the loosely wound film in a heat chamber. In addition, in the case of employing solution casting for production, leaving the film in a drying oven for a long period is one method of reducing the residual solvent, preferably until none remains. Adding preferably 0.1–20% by weight, more preferably 0.5–10% by weight, and even more preferably 0.5–5% by weight with respect to resin of a plasticizer such as dioctyl adipate, dioctyl phthalate, or isodecyl adipate to the casting solution before hand, is another method. Because the drying time required for practically eliminating the residual solvent is reduced by $\frac{1}{5}$–$\frac{1}{20}$ when a plasticizer is added, such a method is advantageous from the perspective of productivity and cost of equipment. The advantageous effects of adding a plasticizer are conjectured to be as follows. That is, it is thought that because cyclic-olefin-based resin molecules have a bulky skelton structure, solvent that enters into these gaps does not easily evaporate, but when a plasticizer is added, the plasticizer enters into the gaps so as to discharge the solvent from the gaps.

The residual shrinkage percentage necessary in order to make the amount of change in optical in-plane retardation of the protective film 5 nm or less is such that surface shrinkage percentage according to a measuring method described later is preferably 0.8% or less, more preferably 0.5% or less, and even more preferably, 0.3% or less.

Figure 1:
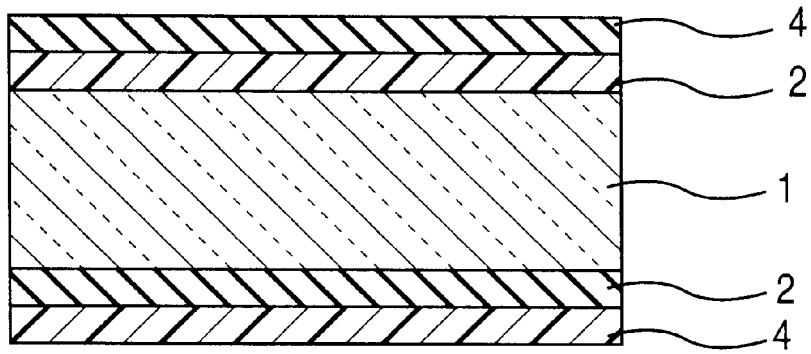
FIG. 1(a) is lateral view of the arrangement of a polarizing plate when in-plane luminance of the polarizing plate is measured.
FIG. 1(b) is a plan view of the same.
Figure 1:
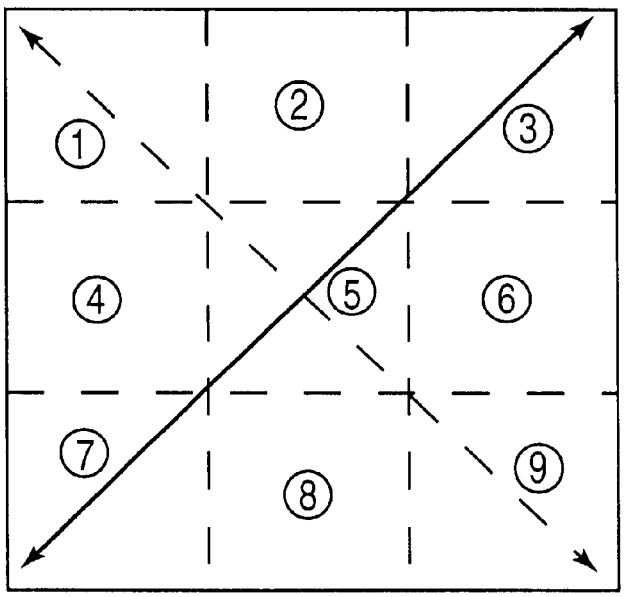

DESCRIPTION OF THE REFERENCE NUMERALS 1 glass substrate
2 binder
3 protective film
4 polarizing plate

BEST MODE FOR CARRYING OUT THE INVENTION

In the following, typical examples of the present invention are described along with comparative examples. The method of measuring and the method of evaluating physical properties employed in the present invention are as follows Water vapor permeability was measured at 40° C. and 90%RH using the Mocon test (Permatran-W600 water permeability measurement device available from Mocon, Inc.).

The method for measuring wetting tension was in compliance with JIS-K6768.

Figure 2:
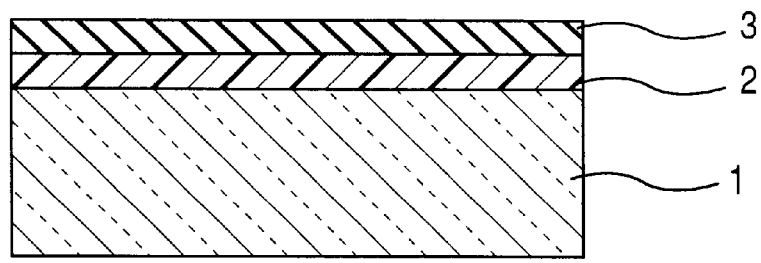
FIG. 2(a) is a lateral view of the arrangement of a polarizing plate when in-plane optical retardation is measured.
FIG. 2(b) is a plan view of the same.
Figure 2:
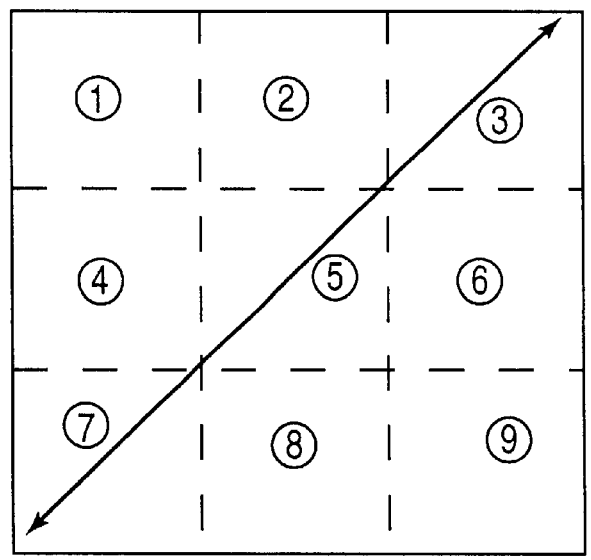

The amount of change in optical in-plane retardation was measured using the following method. Specifically, as shown in FIG. 2(a), a protective film 3 cut to a size length×width=100 mm×100 mm is adhered to a glass substrate 1 with a binder 2 made of acrylester-based base resin and an isocyanate-based curing agent interposed. Using a birefringence analyzer (Kobra automated birefringence analyzer available from Oji Keisoku, Inc.), optical in-plane retardation was then measured in each of nine sections divided as shown in FIG. 2(b), and the average value $R_0$ was obtained. After then subjecting this to an 80° C. atmosphere for 24 hours, the optical in-plane retardation was measured in the same nine sections, and the average value R was obtained.

The surface shrinkage percentage was measured using the following method. Specifically, a single protective film was cut to a size length×width=100 mm×100 mm, and after subjecting the film to an 80° C. atmosphere for 100 hours, the surface shrinkage percentage was determined from Equation (1) below, where M is the length (mm) and T is the width (mm).

$$\text{Surface Shrinkage Percentage}(\%) = \{(100 \times 100) - (M \times T)\} \div (100 \times 100) \times 100 \quad (1)$$

The polarization efficiency of polarizing plates was determined using the following method. Specifically, two polarizing plates were arranged on top of one another so that the polarization axes were oriented in the same direction, and $T_1$ was taken to be the average value for light transmissivity measured continuously from a wavelength of 400 nm to a 700 nm using a spectrophotometer. Two polarizing plates were then arranged so that the polarization axes were perpendicular to one another, and $T_2$ was taken to be the average value for light transmissivity measured in the same manner. Polarization efficiency was thus determined from Equation (2) below. A higher numerical value indicates better polarization performance.

$$\text{polarization efficiency}(\%) = \sqrt{\frac{T_1 - T_2}{T_1 + T_2}} \times 100 \quad (2)$$

The single transmissivity of a polarizing plate is the average value for the light transmissivity of one polarizing plate measured continuously from a wavelength of 400 nm to a 700 nm using a spectrophotometer. A higher numerical value indicates better transparency of the polarizing plate.

The humidity/heat resistance test of the polarization efficiency of polarizing plates was carried out using the method below. Specifically, a polarizing plate was subjected to an atmosphere of 80° C. and 90%RH for 48 hours. The retention of the polarization efficiency is a value obtained by dividing the polarization efficiency after the test by the polarization efficiency before the test. A higher numerical value indicates better humidity/heat resistance.

Measurement and evaluation of hue shift were carried out using the following method. Specifically, using SZ-Σ80II available from Nippon Electric Industries Co., Ltd., a value "a" and a value "b" for a single polarizing plate were measured before and after subjecting the polarizing plate to an atmosphere of 80° C. and 90%RH for 24 hours according to the Hunter-Lab method. A greater amount of change in a value "a" or a greater amount of change in a value "b" indicates a greater hue shift.

Light leakage was evaluated using the in-plane luminance of a polarizing plate. Measurement and evaluation of the in-plane luminance of a polarizing plate are carried out as follows. Specifically, two polarizing plates 4 of dimensions 100 mm×100 mm cut from a long polarizing plate at an angle of 45° with respect to the polarization axis were adhered to either side of a glass substrate 1 with a binder 2 interposed so that the polarization axes were perpendicular to one another, and this structure was subject to an atmosphere of 80° C. and 90%RH for 24 hours, and then this structure was arranged on a backlight (Fuji Color Light Box 5000 available from Fuji Color Trading Co., Ltd.). The light source from the backlight was set to 100% reference value, and luminance was measured in each of nine sections divided as shown in FIG. 1(b) using a luminance meter (LS-100 available from Minolta Co., Ltd.). Using the resulting values, the amount of light leakage as shown by Equation (3) below was determined. In this case, a closer numerical value to 1 indicates less light leakage.

In addition, light leakage was visually evaluated.

$$\begin{pmatrix}\text{Amount of}\\\text{Light Leakage}\end{pmatrix} = \left(\begin{matrix}\text{Average}\\\text{Luminance of}\end{matrix} ②④⑥⑧\right) \div \left(\begin{matrix}\text{Average}\\\text{Luminance of}\end{matrix} ①③⑤⑦⑨\right) \quad (3)$$

Note that the arrows shown in FIG. 1(b) indicate the polarization axes of the polarizing plates.

EXAMPLE 1

After dissolving 25 parts by weight of cyclic-olefin-based resin (Zeonor 1600R available from Zeon Corporation) in 75 parts by weight of a mixed solvent of xylene, cyclohexane, and toluene (1:1:1 mixing ratio by weight), a film was fabricated by solution casting. Both sides of the resulting film were then subjected to a corona discharge treatment at a treatment intensity of 100 W/m²/min air, and a mixed solution of polyester polyol (Seikadyne LB available from Dainichiseika Color and Chemicals Mfg. Co., Ltd.) and polyisocyanate (Seikadyne 3500A available from Dainichiseika Color and Chemicals Mfg. Co., Ltd.) (1:11 mixing ratio by weight) was coated, as a first anchor coat layer, on one surface of the film so that the thickness after drying was 0.2 μm and allowed to dry. In addition, on the first anchor coat layer, a 5% aqueous solution of polyvinyl alcohol with an average degree of polymerization of 1500 and a degree of saponification of 99% was coated as a second anchor coat layer so that the thickness after drying was 2 μm and allowed to dry. Thus, a protective film having thereon two layers of anchor coat agents and having a thickness of 52 μm, a width of 550 mm, and a length of 200 m was obtained. (Note that, immediately before winding the film, hot air at a temperature of 120° C. was introduced to the film for 10 seconds while the film was under a draw ratio of −0.2% between rollers, and distortions of molecular chains in the cyclic-olefin-based resin were thereby corrected and the residual shrinking percentage was reduced.)

The water vapor permeability of the protective film obtained in such a manner was 3.0 g/m²/24 hours, and wetting tension was 600 μN/cm (23° C.). The residual amount of solvent, the surface shrinkage percentage, and the optical in-plane retardation $R_0$, R, and $R-R_0$ are as shown in Table 1.

EXAMPLE 2

A PVA film (Kuraray vinylon film VF-9X75R available from Kuraray Co., Ltd., thickness 75 μm) was immersed for 5 minutes in an aqueous solution that is 5000 parts by weight of water, 35 parts by weight of iodine, and 525 parts by weight of potassium iodide such that the iodine was adsorbed. After then uniaxially stetching the film in the longitudinal direction to about 4.4 times in a 4% by weight of aqueous solution of boric acid having a temperature of 45° C., the film was dried while under tension to obtain a polarizing film.

Next, using a 5% aqueous solution of PVA having an average degree of polymerization of 1800 and a degree of saponification of 99% as an adhesive, in such a manner that the thickness of the laminate structure that results after drying is 1 μm, the adhesive in a non-dried state, Next, the following process was carried out. The polarizing film and the pair of protective films obtained in Example 1 were arranged on top of one another with a 5% aqueous solution of PVA interposed therebetween serving as an adhesive and with the anchor coat sides of the protective films facing either side of the polarizing film. The aqueous solution of PVA had an average degree of polymerization of 1800 and a degree of saponification of 99%. The structure was then secured between a rubber roller and a metal roller (the rubber roller has a diameter of 200 mm, the metal roller has a diameter of 350 mm, line pressure is 10 kg/cm) and wound in such a manner that the thickness of an adhesive layer that results after drying 1 μm. The structure was left in the wound state (length of 100 m) for 24 hours in a chamber having a temperature of 40° C. The results of the evaluation of the resulting polarizing plate are shown in Table 2.

EXAMPLE 3

A polarizing plate was obtained in the same manner as Example 2, using the protective film of Example 1 in a wound state which was stored at room temperature for a month. The results of the evaluation of this polarizing plate are shown in Table 2.

COMPARATIVE EXAMPLE 1

A polarizing plate was obtained in the same manner as Example 3, except that the second anchor coat layer made of polyvinyl alcohol was not provided. The results of the evaluation of this polarizing plate are shown in Table 2.

COMPARATIVE EXAMPLE 2

A polarizing plate was obtained in the same manner as Example 1 and Example 2, except that a corona discharge treatment was not carried out, that both the first and second anchor coat layers were not provided, and that an emulsion-type, 2-part epoxy acrylic-based adhesive (the base resin is E-Tec Emulsion AE943 available from Japan Synthetic Rubber Co., Ltd. and the hardening agent is Aquanate 100 available from Nippon Polyurethane Industry Co., Ltd., (10:1 mixing ratio by weight)) was used for the adhesive. The results of the evaluation of this polarizing plate are shown in Table 3.

COMPARATIVE EXAMPLES 3 and 4

Two types of protective films having differing amounts of change in optical in-plane retardation were fabricated using the same casting solution as that employed in Example 1. The residual amount of solvent, the surface shrinkage percentage, and optical in-plane retardation $R_0$, R, and $R-R_0$ of these films are as shown in Table 1. Using these protective films, polarizing plates were then obtained in the same manner as Example 2. The results of the evaluation of the polarizing plates are shown in Table 3.

TABLE 1

|  |  | Units | Example 1 | Comparative Example 3 | Comparative Example 4 |
|---|---|---|---|---|---|
| Residual amount of solvent |  | ppm | 1,000 | 8000 | 50 |
| Surface shrinkage percentage |  | % | 0.12 | 1.05 | 1.50 |
| In-plane retardation | $R_0$ | nm | 0.2 | 0.9 | 3.3 |
|  | R | nm | 3.7 | 10.2 | 14.7 |
|  | $R - R_0$ | nm | 3.5 | 9.3 | 11.4 |

TABLE 2

|  |  | Units | Example 2 | Exaample 3 | Comparative Example 1 |
|---|---|---|---|---|---|
| Single Transmissivity |  | % | 41.9 | 41.9 | 41.9 |
| Polarization efficiency |  | % | 99.9 | 99.9 | 99.9 |
| Retention of polarization efficiency |  | — | 1.00 | 1.00 | 1.00 |
| Hue b | Initial value | — | 2.28 | 2.29 | 2.33 |
|  | After wet heating | — | 2.80 | 2.79 | 3.96 |
| Hue a | Initial value | — | −0.71 | −0.71 | −0.73 |
|  | After wet heating | — | −0.88 | −0.87 | −1.18 |
| Amount of light leakage |  | — | 1.34 | 1.29 | 2.38 |
| Visual Evaluation of Light Leakage |  | — | None | None | Small Amount |

TABLE 3

|  | Units | Comparative Example 2 | Comparative Example 3 | Comparative Example 4 |
|---|---|---|---|---|
| Single Transmissivity | % | 41.9 | 41.9 | 41.9 |
| Polarization efficiency | % | 99.9 | 99.9 | 99.9 |
| Retention of polarization efficiency | — | 1.00 | 1.00 | 1.00 |

TABLE 3-continued

|  |  | Units | Comparative Example 2 | Comparative Example 3 | Comparative Example 4 |
|---|---|---|---|---|---|
| Hue b | Initial value | — | 2.18 | 2.26 | 2.32 |
|  | After wet heating | — | 4.36 | 2.91 | 2.88 |
| Hue a | Initial value | — | −0.76 | −0.71 | −0.68 |
|  | After wet heating | — | −0.06 | −0.97 | −0.99 |
| Amount of Light leakage | | — | 2.60 | 6.91 | 7.40 |
| Visual Evaluation of Light Leakage | | — | Small Amount | Yes | Yes |

INDUSTRIAL APPLICABILITY

The present invention makes it possible to provide a polarizing plate having high durability and high polarization efficiency with which the three factors that contribute to a degradation in liquid crystal display performance under a high humidity/high temperature environment, drop in polarization efficiency, hue shift, and light leakage, substantially do not occur. In addition, the present invention makes it possible to provide a polarizing plate, with which high adhesive strength can be maintained between the protective film and the polarizing film even after being stored for an extended period of time, and adhesion is completed in a short time.

What is claimed is:

1. A polarizing plate comprising a polarizing film made of polyvinyl-alcohol or a derivative thereof, a protective film mainly composed of a resin made of cyclic-olefin or a derivative thereof, the protective film having coated thereon two anchor coat agent layers, and the protective film being laminated on at least one side of the polarizing film with an adhesive:

wherein the amount of change in optical in-plane retardation of the protective film is 5 nm or less after 24 hours in an atmosphere of 80° C., and the wetting tension of the surface to be anchor-coated of the protective film is 500 $\mu$N/cm (23° C.) or more;

wherein the anchor coat agent layers include a first layer made of polyisocyanate and polyester polyol and/or polyether polyol, and a second layer made of polyvinyl alcohol; and wherein the adhesive is made of polyvinyl alcohol.

2. The polarizing plate of claim 1, wherein the first layer is made of polyester polyol.

3. The polarizing plate of claim 1, wherein the first layer is made of polyether polyol.

* * * * *

UNITED STATES PATENT AND TRADEMARK OFFICE
CERTIFICATE OF CORRECTION

PATENT NO. : 6,726,995 B2
DATED : April 27, 2004
INVENTOR(S) : Yoshinori Ishii et al.

It is certified that error appears in the above-identified patent and that said Letters Patent is hereby corrected as shown below:

<u>Column 9,</u>
Line 53, change "drying 1 µm" to -- drying is 1µm --.

<u>Column 12,</u>
Lines 6, 7 and 8, delete "or a derivative thereof".
Lines 23 and 25, insert -- polyisocyanate and -- after "made of".

Signed and Sealed this

Seventeenth Day of August, 2004

JON W. DUDAS
*Acting Director of the United States Patent and Trademark Office*